Nov. 3, 1959     A. J. KRAUSE     2,911,604

HERMETICALLY SEALED HOUSING

Filed April 30, 1957

ALFRED J. KRAUSE,
INVENTOR

BY

AGENT

United States Patent Office 2,911,604
Patented Nov. 3, 1959

2,911,604

HERMETICALLY SEALED HOUSING

Alfred J. Krause, Los Angeles, Calif., assignor to Hughes Aircraft Company, Culver City, Calif., a corporation of Delaware Application April 30, 1957, Serial No. 658,914

1 Claim. (Cl. 336—90)

The present invention relates to a device for hermetically sealing coils, and more particularly to a housing for hermetically sealing a transformer coil or choke.

It is necessary to protect the coils of a transformer or a choke against degradation and eventual breakdown where such electrical components are to be used under adverse conditions of heat and moisture. One prior method is to imbed the coil in a resin. This method was found to be inadequate because the resin itself degrades under adverse temperature and moisture conditions.

Another method for protecting the coil is to seal or imbed the entire transformer or choke, including the coil and core, in a plastic or nonconductive material. This method proves unsatisfactory, particularly where such components are to be used in aircraft because of the increased size and weight of the transformer or choke.

It is therefore an object of the present invention to provide a housing for hermetically sealing the coil of a transformer or choke.

It is another object of the present invention to provide a hermetically sealed transformer or choke having minimum size and weight.

It is a further object of the present invention to provide a hermetically sealed housing which will protect transformer or choke coils against adverse environmental conditions.

In accordance with the present invention, these objects are achieved by enclosing only the coils of transformer or choke assemblies in a hermetically sealed housing. In this manner, the coils are protected against adverse environmental conditions without materially increasing the size and weight of the transformer or choke as where the entire assembly is sealed.

The novel features which are believed to be characteristic of the invention both as to its organization and method of operation together with further objects and advantages thereof will be better understood from the following description considered in connection with the accompanying drawing in which.

Figure 1:
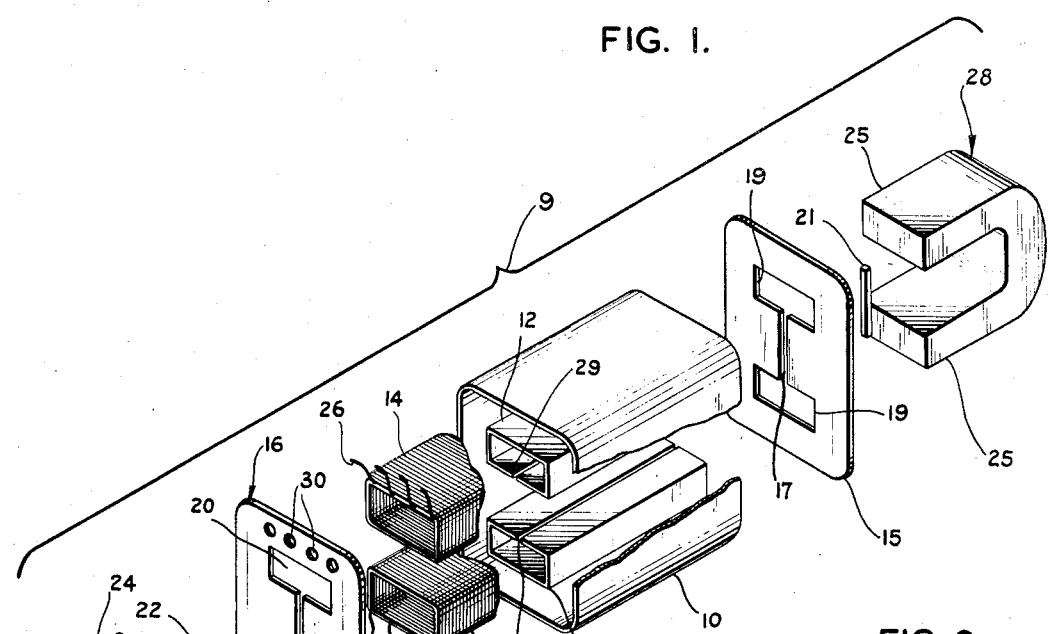
Fig. 1 is an exploded isometric view, partly broken away, showing the housing of the invention for hermetically sealing the coil of a transformer.

Referring now to the drawing, and in particular to Fig. 1, a transformer 9 is shown employing the hermetically sealed housing of the present invention. Two core-receiving shells 11 and 12 provide an outer surface over which are wound two coils 13 and 14. Coils 13 and 14 may each be comprised of a primary and a secondary winding which may be connected either in series or in parallel and having pairs of leads 26. Shells 11 and 12 provide hollow spaces into which two cores 27 and 28 are inserted. The configuration of shells 11 and 12 is determined by the shape of the legs of the cores. As shown, each core 27 and 28 is U-shaped, having legs 24 and 25 respectively with substantially rectangular cross-sections. Accordingly, shells 11 and 12 have corresponding rectangular cross-sections to receive the core legs 24 and 25.

Along the longitudinal lengths of shells 11 and 12 are slots 29 which provide a break in the circulating currents generated on the surfaces of shells 11 and 12 by coils 13, 14 and cores 27, 28. Slots 29 preferably are filled with an insulating material such as glass, resin, or ceramic to both break the circulating currents and to seal the slots. If shells 11 and 12 are made of a nonconductive material such as glass, resin, or plastic, there is no necessity for slots 29 since no circulating currents will be produced.

To hermetically seal coils 13 and 14, an outer shell 10, made of a suitable material such as tinned cold-rolled steel is sealed, as by soldering or brazing, to end plates 15 and 16, which may also be made of a suitable material such as tinned cold-rolled steel. Plates 15 and 16 contain apertures 19 and 20. Apertures 19 and 20 serve to space apart and secure core receiving shells 11 and 12 within outer shell 10 and also to provide access for core legs 24 and 25 through plates 15 and 16 into shells 11 and 12. The configuration of apertures 19 and 20 is also determined by the shape of core legs 24 and 25. Plates 15 and 16 are sealed to core-receiving shells 11 and 12 as by soldering or brazing the area surrounding apertures 19 and 20 to shells 11 and 12.

Plates 15 and 16 contain slots 17 and 18, interconnecting apertures 19 and 20, which are filled with insulating rods 21 and 22 respectively. Rods 21 and 22, which may be made for example, of glass, ceramic or plastic, serve to break the circulating currents produced by the core on plates 15 and 16. As with slots 29 in core receiving shells 11 and 12, if plates 15 and 16 are made of a nonconductive material as for example, of glass, ceramic, or plastic, there is no need for slots 17 and 18 since there is no circulating current circuit to be broken. Leads 26 project through plate 16 at holes 30 and are sealed to terminals on plate 16.

Figure 2:
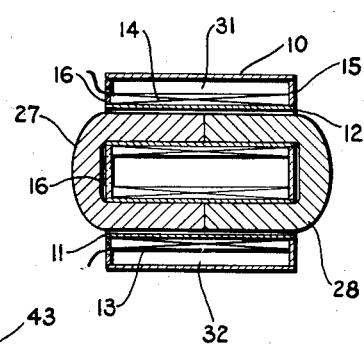
Fig. 2 is a cross-section of the transformer of Fig. 1 showing the housing of the invention assembled about the transformer coils.

Fig. 2 shows the assembled housing of Fig. 1 with cores 27 and 28 inserted into core-receiving shells 11 and 12. Outer shell 10, sealed to plates 15 and 16, forms airtight chambers for coils 31 and 32 between the shell 10, plates 15 and 16 and core-receiving shells 11 and 12. The assembled housing thereby provides protection against heat and moisture for coils 13 and 14 while permitting cores 27 and 28 to be readily inserted and removed from core-receiving shells 11 and 12.

Figure 3:
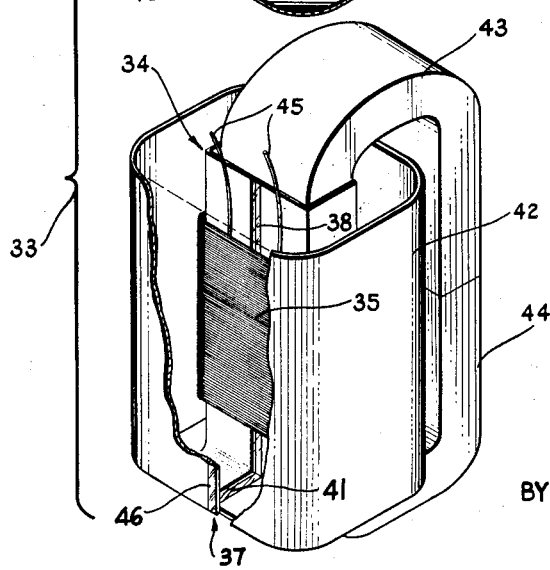
Fig. 3 is an exploded isometric view, partly broken away, showing the housing of the invention for hermetically sealing a choke coil.

Fig. 3 illustrates another embodiment of the present invention wherein the housing hermetically seals the coil of a choke 33. This embodiment may also be used to hermetically seal a transformer coil consisting of a primary and a secondary winding.

The housing for choke 33 is comprised of a core-receiving shell 34 which may be made, for example, of cold-rolled steel. Over the surface of shell 34 is wound coil 35 with leads 45 which project through holes 46 in plate 36 and may be sealed to terminals on plate 36. The configuration of core-receiving shell 34, shown as a parallelepiped, is determined by the shape of the legs of cores 43 and 44.

Along the longitudinal length of shell 34 is slot 38 which may be filled with an insulating material such as glass, ceramic, or plastic to both break the circulating currents produced on the surface of shell 34 and to seal slot 38. If shell 34 is made of a nonconductive material such, as for example, glass, ceramic, or plastic, there is no need for slot 38 since no circulating current circuit will be produced on the surface of shell 34.

To hermetically seal coil 35, an outer shell 42 made of a suitable material, such as tinned cold-rolled steel, is sealed, as by soldering or brazing, to end plates 36 and 37 which may also be made of a suitable material such as tinned cold-rolled steel. Outer shell 42 contains slot 46 which is filled with an insulating material such as glass, ceramic, or plastic. Plates 36 and 37 contain apertures as shown by aperture 39, through which a leg of cores 43 and 44 may be passed into the hollow of core-receiving shell 34. The configuration of aperture 39 is also determined by the shape of the core legs. Plates 36 and 37 are sealed to core receiving shell 34 as by soldering or brazing the area surrounding apertures 39 to shell 34.

Plates 36 and 37 contain slots 40 and 41 which are filled with an insulating material such as glass, ceramic, or plastic, to break the circulating currents produced on plates 36 and 37. If plates 36 and 37 and shell 42 are made of a nonconductive material such as glass, ceramic or plastic, there is no need for slots 40, 41 and 46 since no circulating currents will be produced on the nonconductive surface.

The resulting housing, when assembled and sealed, provides an airtight chamber between shell 34, plates 36 and 37, and shell 42. Coil 35, enclosed within the chamber, is thereby protected against heat and moisture while permitting the legs of cores 43 and 44 to be readily removed.

It is seen that there has been disclosed a housing for hermetically sealing and protecting the coils of transformers or chokes against heat and moisture. The housing disclosed has the advantage of being of light weight and small size as compared with the technique of enclosing the entire transformer or choke in a resin. The housing disclosed also has the additional advantage of utilizing materials which will not degrade in the presence of heat and moisture.

What is claimed as new is:

A hermetically sealed housing for use with a pair of electrical coils and U-shaped core members having parallel core portions, said housing comprising, in combination: a pair of hollow rectilinear internal members each having a longitudinal slot therein; a nonconductive insert secured and sealed in each of said slots, one of said pair of coils being disposed about each of said internal members; an open end, tubular outer housing member positioned in surrounding spaced relationship to said internal members and said coils; independent end members having spaced apertures for receiving said core portions of said core members, said end members being each secured and sealed with respect to ends of said outer housing member and ends of each of said internal members; a transverse slot in each of said end members and intersecting said apertures therein; and a nonconductive insert secured and sealed in each transverse slot.

References Cited in the file of this patent

UNITED STATES PATENTS

| | | |
|---|---|---|
| 1,545,429 | Hunt | July 7, 1925 |
| 1,594,506 | Hansen | Aug. 3, 1926 |